(12) United States Patent
Kim et al.

(10) Patent No.: US 10,451,920 B2
(45) Date of Patent: Oct. 22, 2019

(54) DISPLAY DEVICE AND METHOD OF MANUFACTURING THE SAME

(71) Applicant: LG DISPLAY CO., LTD., Seoul (KR)

(72) Inventors: EuiJung Kim, Gyeonggi-do (KR); Jaejun Kim, Gyeonggi-do (KR); GilYoung Lim, Gyeonggi-do (KR); Taebok Min, Gyeonggi-do (KR); HyunCheol Cho, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 12 days.

(21) Appl. No.: 15/822,508

(22) Filed: Nov. 27, 2017

(65) Prior Publication Data

US 2018/0180939 A1    Jun. 28, 2018

(30) Foreign Application Priority Data

Dec. 22, 2016   (KR) .................. 10-2016-0176351

(51) Int. Cl.
 *G02F 1/1335* (2006.01)
 *G02F 1/1333* (2006.01)
(52) U.S. Cl.
 CPC .. *G02F 1/133308* (2013.01); *G02F 1/133608* (2013.01); *G02F 1/133615* (2013.01); *G02F 2001/133317* (2013.01); *G02F 2202/28* (2013.01)

(58) Field of Classification Search
 CPC ......... G02F 1/133615; G02F 1/133603; G02F 2001/133317; G02F 1/133608; G02F 1/133308
 See application file for complete search history.

(56) References Cited

U.S. PATENT DOCUMENTS

2012/0262643 A1\* 10/2012 Kweon ............... G02B 6/0091
                                                    349/58
2018/0196311 A1\*  7/2018 Wu

\* cited by examiner

*Primary Examiner* — Thanh Nhan P Nguyen
(74) *Attorney, Agent, or Firm* — Morgan, Lewis & Bockius LLP (57) ABSTRACT

A display device and a method of manufacturing the same are provided. A display device includes: a light guide plate on a rear surface of a display panel, the light guide plate being configured to direct light toward the display panel, a reflector on a rear surface of the light guide plate, the reflector being configured to reflect light from a rear of the light guide plate toward a front surface of the light guide plate, a back cover on a rear surface of the reflector, and a light-emitting diode array coupled to an edge of the back cover, the light-emitting diode array including: a printed circuit board, and a plurality of light-emitting diodes at a side surface of an edge of the light guide plate, the plurality of light-emitting diodes being configured to generate light, the plurality of light emitting diodes being attached to the printed circuit board.

14 Claims, 6 Drawing Sheets

DISPLAY DEVICE AND METHOD OF MANUFACTURING THE SAME

CROSS-REFERENCE TO RELATED APPLICATIONS

This application claims the priority of Korean Application No. 10-2016-0176351, filed on Dec. 22, 2016, the entirety of which is hereby incorporated by reference.

BACKGROUND

1. Technical Field

The present disclosure relates to a display device and a method of manufacturing the same.

2. Discussion of the Related Art

In general, research into flat panel display devices, such as liquid crystal display (LCD) devices, plasma display devices, field emission display devices, and organic light-emitting display devices, has been actively undertaken. Among such flat panel display devices, LCD devices and organic light-emitting display devices have recently come to prominence, due to advantages thereof, such as adaptability to mass production, easy implementation of driving units, as well as the realization of high resolution.

Figure 1:
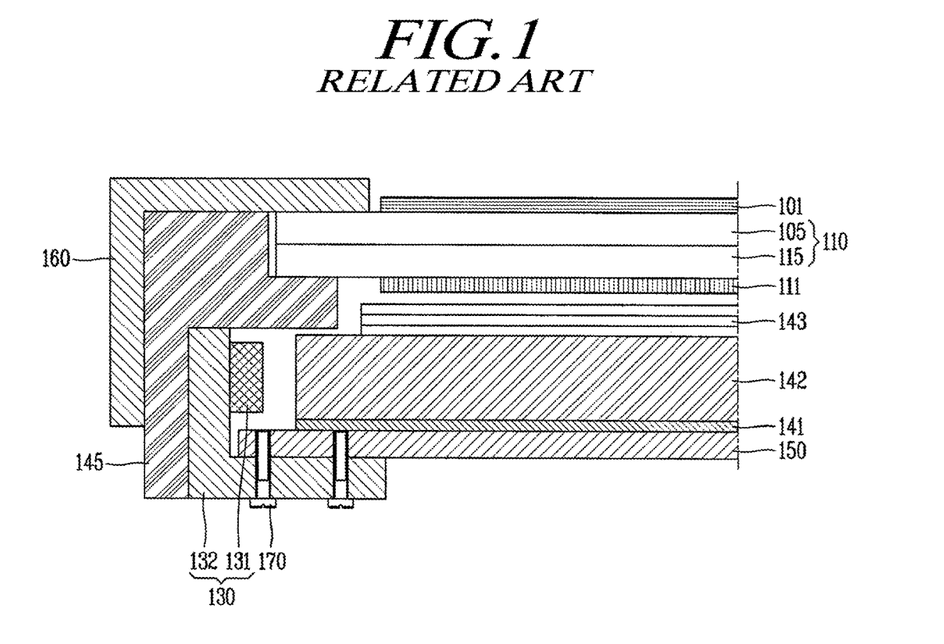
FIG. 1 is a cross-sectional view schematically illustrating an LCD device of the related art.
Figure 2:
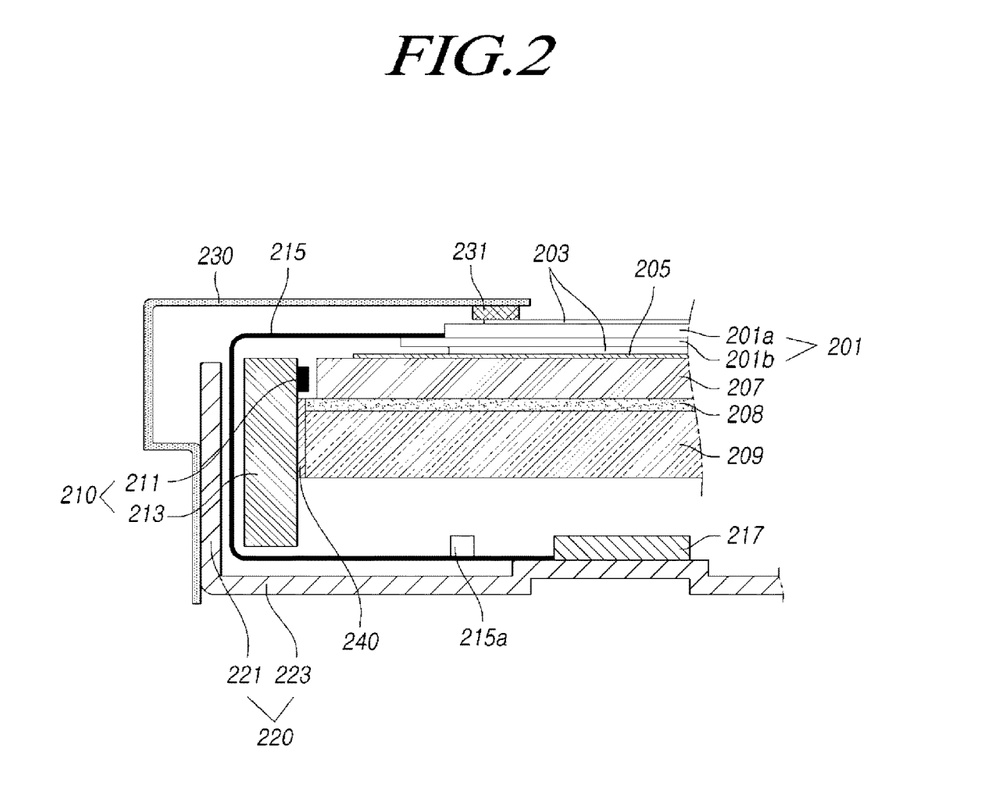
FIGS. 2 to 5 are cross-sectional views schematically illustrating LCD devices according to example embodiments.
Figure 3:
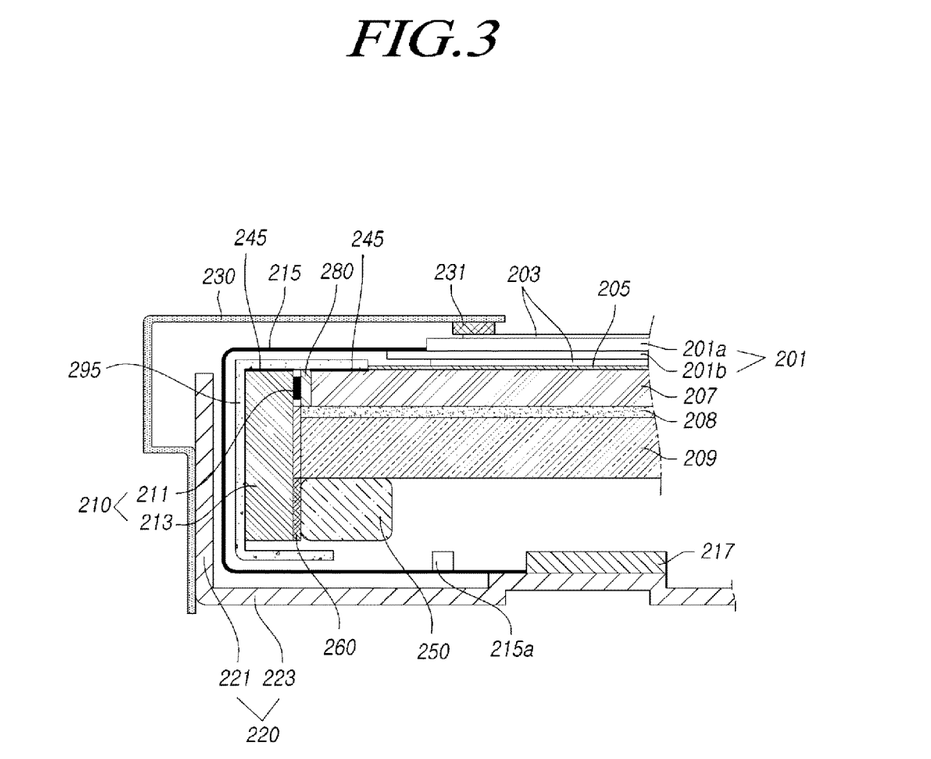

FIG. 1 is a cross-sectional view schematically illustrating an LCD device of the related art.

The LCD device includes a display panel 110 in which a plurality of pixels are arranged in the form of a matrix to display images, a backlight unit disposed at the rear of the display panel to emit light across the entire area of the display panel 110, and a panel guide 145 housing and fixing the display panel 110 and the backlight unit.

The display panel 110 includes a color filter substrate 105 and an array substrate 115 connected to each other while facing each other, such that uniform cell gaps are maintained. The display panel 110 further includes a liquid crystal layer (not shown) situated between the color filter substrate 105 and the array substrate 115.

Top and bottom polarizers 101 and 111 are attached to outer portions of the display panel 110. The bottom polarizer 111 polarizes light that has passed through the backlight unit, while the top polarizer 101 polarizes light that has passed through the display panel 110.

Specifically, the backlight unit includes a reflector 141 disposed on top of a cover bottom 150, a light-emitting diode (LED) assembly 130 disposed adjacently to at least one edge of the reflector 141, and a light guide plate 142 disposed on a path on which light generated by the LED array 130 exits to emit the light in the direction toward the display panel 110.

The LED assembly 130 includes a plurality of LED arrays 131 and an LED housing 132 to which a printed circuit board (PCB, not shown) driving the LED arrays 131 is attached. Light generated by LED arrays 131 enters the transparent light guide plate 142 through one edge thereof, and light that would otherwise exit the light guide plate 142 through the rear surface is reflected by the reflector 141 disposed on the rear surface of the light guide plate 142 in the direction toward optical sheets 143 disposed on top of the light guide plate 142. This can consequently reduce light loss while improving the uniformity of backlighting.

The display panel 110, including the color filter substrate 105 and the array substrate 115, is seated on the top portion of the backlight unit using the panel guide 145. The display panel 110, the panel guide 145, and the backlight unit are connected to each other by the cover bottom 150 having a plurality of fastening devices 170 disposed on the bottom portion and a case top 160 disposed on the top portion.

However, in the above-described display device of the related art, the coupling structure of the display panel or the backlight unit uses a plurality of fastening means, such as the LED array, the LED housing, the panel guide, and the cover bottom. This consequently complicates the assembly process and increases assembly costs, both of which are problematic.

In particular, misalignment occurs in the coupling portions of the display panel and the backlight unit due to accumulated allowances of components. This consequently causes luminance degradation and defective screen images in the display device, thereby lowering the marketability of the display device and the degree of commitment to images displayed on the screen.

SUMMARY

Accordingly, the present disclosure is directed to a display device and a method of manufacturing the same that substantially obviate one or more of the issues due to limitations and disadvantages of the related art.

An aspect of the present disclosure is to provide a display device having a simplified structure, by which a display panel, a backlight unit, and the like are coupled, to reduce procedures required in an assembly process and costs.

Another aspect of the present disclosure is to provide a display device in which accumulative allowances occurring in coupling portions of the display panel and the backlight unit are reduced to prevent degradations in luminance and defective screen images in display devices due to misalignment, thereby improving consumer satisfaction and marketability.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display device, including: a light guide plate on a rear surface of a display panel, the light guide plate being configured to direct light toward the display panel, a reflector on a rear surface of the light guide plate, the reflector being configured to reflect light from a rear of the light guide plate toward a front surface of the light guide plate, a back cover on a rear surface of the reflector, and a light-emitting diode array coupled to an edge of the back cover, the light-emitting diode array including: a printed circuit board, and a plurality of light-emitting diodes at a side surface of an edge of the light guide plate, the plurality of light-emitting diodes being configured to generate light, the plurality of light emitting diodes being attached to the printed circuit board.

In another aspect, there is provided a method of manufacturing a display device, the method including: providing a light guide plate on a rear surface of a display panel to direct light toward the display panel, providing a reflector on a rear surface of the light guide plate to reflect light from a rear of the light guide plate toward a front surface of the light guide plate, providing a back cover on a rear surface of the reflector, and coupling a light-emitting diode array to an edge of the back cover, the coupling the light-emitting diode array including: providing a printed circuit board, and providing a plurality of light-emitting diodes at a side surface of an edge of the light guide plate to generate light, the plurality of light-emitting diodes being attached to the printed circuit board.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to some embodiments of the present disclosure, examples of that may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

FIGS. 2 to 5 are cross-sectional views schematically illustrating a liquid crystal display (LCD) device according to example embodiments. FIGS. 6A to 6C are reference views illustrating portions of a process of assembling the display device according to example embodiments.

As illustrated in the examples of FIGS. 2 to 6C, a display device according to example embodiments may include a light guide plate 207 disposed on the rear surface of a display panel 201 to emit light toward the display panel 201, a reflector 208 disposed on the rear surface of the light guide plate 207 to reflect light exiting the rear surface of the light guide plate 207 to be redirected toward the front surface (or top surface) of the light guide plate 207, a back cover 209 disposed on the rear surface of the reflector 208, and a light-emitting diode (LED) array 210 coupled to one edge of the back cover 209. The LED array 210 may include a plurality of LEDs 211 disposed adjacent to one edge of the light guide plate 207 to generate light, and may include a printed circuit board (PCB) 213 on which the LEDs 211 are mounted.

With reference to the examples of FIGS. 2 to 5, in the display device according to example embodiments, an optical sheet 205, the display panel 201, polarizer films 203, and the like may be disposed on the front surface of the light guide plate 207. In addition, the reflector 208, the back cover 209, and the like may be disposed on the rear surface of the light guide plate 207, while the LED array 210, a light guide member 295, and the like may be disposed on at least one edge of the light guide plate 207. The light guide plate 207 may be disposed on the rear surface of the display panel 201 to emit light toward the display panel 201, while the reflector 208 may be disposed on the rear surface of the light guide plate 207 to reflect light exiting the rear surface of the light guide plate 207 to be redirected toward the front surface of the light guide plate 207, thereby reducing light loss and improving the uniformity of backlighting.

The LED array 210 may include the plurality of LEDs 211 and the PCB 213 on which the LEDs 211 may be mounted. According to example embodiments, the LED array 210 may be connected to one edge of the back cover 209, such that the position of the LED array 210 can be accurately aligned with the positions of the light guide plate 207 and the back cover 209.

For example, according to example embodiments, the LED array 210 may be connected to the back cover 209 in a position in which the LEDs 211, supplying light to the light guide plate 207, may be disposed on the side surface of the light guide plate 207, such that light from the LEDs 211 can be accurately supplied to the light guide plate 207, and may be integrally stacked on the back cover 209. In addition, an error in the assembly of the LED array 210 and the back cover 209 can be minimized.

Although example embodiments will be described with reference to an example using an LCD panel, example embodiments are also applicable to an example using an organic light-emitting display panel. An organic light-emitting display panel may include a lower substrate including a plurality of light-emitting cells located in areas defined by gate lines, data lines, and power (VDD) lines, and an upper substrate attached to the lower substrate while facing the lower substrate.

According to example embodiments, the display panel 201 may include casing members for encasing a backlight unit, a driver circuit unit, the display panel 201, and a backlight unit. The driver circuit unit may include control circuits, such as a data driver circuit (or a source driver circuit), a gate driver circuit (or a scanning driver circuit), a timing controller, a PCB, and the like.

In addition, according to example embodiments, a liquid crystal layer may be situated between the upper substrate 201a and the lower substrate 201b of the display panel 201. The upper substrate 201a may be a color filter substrate corresponding to a display screen, while the lower substrate 201b may be a thin-film-transistor (TFT) substrate.

A source PCB 217 may be disposed on the rear surface of the oblong display panel 201, adjacently to one edge of the display panel 201. The source PCB 217 may be electrically connected to the display panel 201 via a plurality of flexible circuit films 215, on each of which an integrated circuit 215a may be mounted, and may be disposed in parallel to the display panel 201.

The plurality of flexible circuit films 215 may be attached to pads and the source PCB 217 by tape-automated bonding (TAB). The flexible circuit films 215 may be implemented using tape carrier packages (TCPs) or chip-on-films ("COF," or chip-on-flexible boards).

Thus, the display panel 201 may be electrically connected to or attached to the source PCB 217 via the plurality of flexible circuit films 215. The PCB 217, which may be wrapped and protected by a cover shield 220, may be electrically connected to the plurality of flexible circuit films 215 to transfer a variety of signals to the display panel 201 to display images thereon.

The backlight unit for supplying light to the display panel 201 may include the LEDs 211, the LED array 210, the light guide plate 207, the reflector 208, and the like. According to example embodiments, the LED array 210 may be directly connected to the back cover 209, instead of being mounted on the LED housing, which is different from the related art.

The timing controller (not shown) mounted on the cover shield 220 may transmit a variety of control signals to the data driver circuit and the gate driver circuit to control the data driver circuit and the gate driver circuit. The timing controller may start scanning based on timing realized in each frame, may convert image data input from an external source into a data signal format readable by the data driver circuit before outputting converted image data, and may regulate data processing at suitable points in time in response to the scanning. The timing controller may be disposed on a control PCB connected to the source PCB 217 via a connection medium, such as a flexible flat cable (FFC), a flexible printed circuit (FPC), or the like.

The LED array 210 and the back cover 209 may be coupled using a bonding member 240. For example, a side surface of the LED array 210 and the side surface of the back cover 209 may be coupled via the bonding member 240, such that the LED array 210 can be fixed to the back cover 209. The bonding member 240 may be an adhesive, a bonding tape, a double-sided tape, or a curable resin. However, embodiments are not limited thereto.

The LED array 210 and the back cover 209 may be coupled to each other, for example, by welding or fusion or by using fastening members, depending on materials. However, when using relatively hard materials, such as glass or sapphire, except for metals or plastics, coupling using welding or fusion may not be applicable, and the use of fastening members may have a problem in that it may be difficult to process fastening holes. Thus, the LED array 210 and the back cover 209 may be coupled using the bonding member 240 because materials are not limited, ease of assembly may be improved, and detachment for reworking may be facilitated.

The display device may further include a support member 250 having a front surface supporting the rear surface of the back cover 209 and a side surface supporting the LED array 210. When the LED array 210 and the back cover 209 are coupled, the support member 250, coupled to a side surface of the LED array 210 and the rear surface of the back cover 209, may guide the LED array 210 and the back cover 209 to be coupled to each other in correct positions.

For example, the support member 250 may be configured such that the front surface thereof may support the rear surface of the back cover 209 and at least one of the front surface and a side surface thereof may be coupled to the back cover 209 or the LED array 210 via a bonding member 260. During assembly, the support member 250 may come into close contact with the rear surface of the back cover 209 and the side surface of the LED array 210, such that the LED array 210 and the back cover 209 may be coupled in fixed coupling positions. Thus, the light guide plate 207, the back cover 209, and the LED array 210 can be coupled in correct positions. The support member 250 and the LED array 210 may be coupled by bonding the support member 250 to the PCB 213 of the LED array 210 using surface mounting technology (SMT), instead of using the bonding member 260.

In addition, the LEDs 211, mounted on the LED array 210, may be fixedly connected to the side surface of one edge of the light guide plate 207 via a transparent bonding member 280. Due to the LEDs 211 being coupled to the light guide plate 207 via the transparent bonding member 280, the LED array 210 and the back cover 209 may be coupled in more correct positions.

Figure 4:
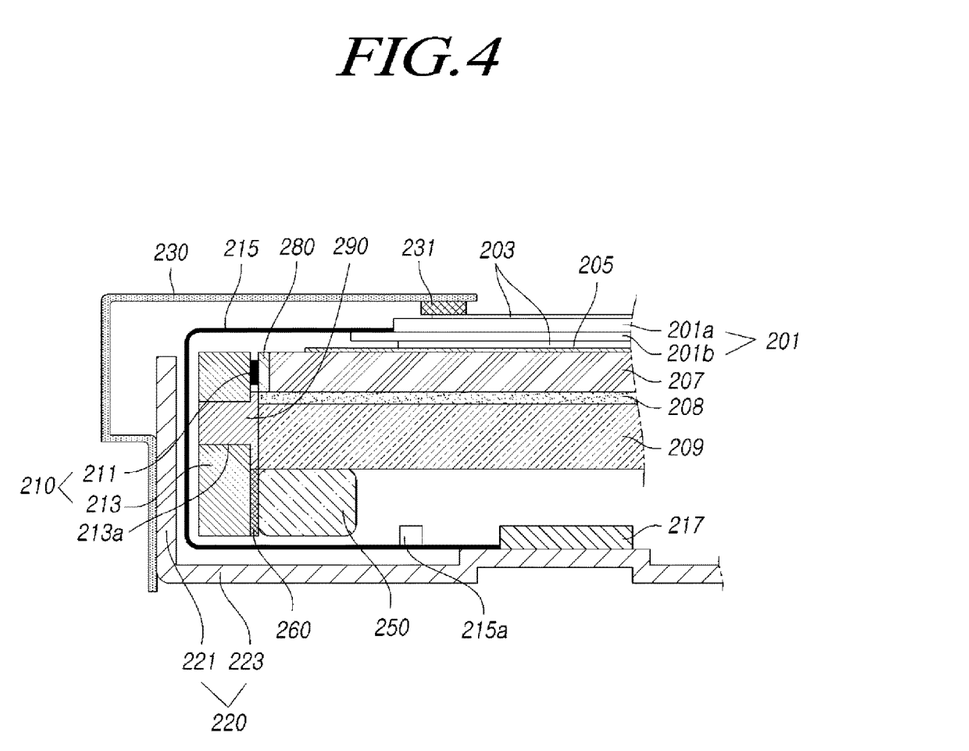
Figure 5:
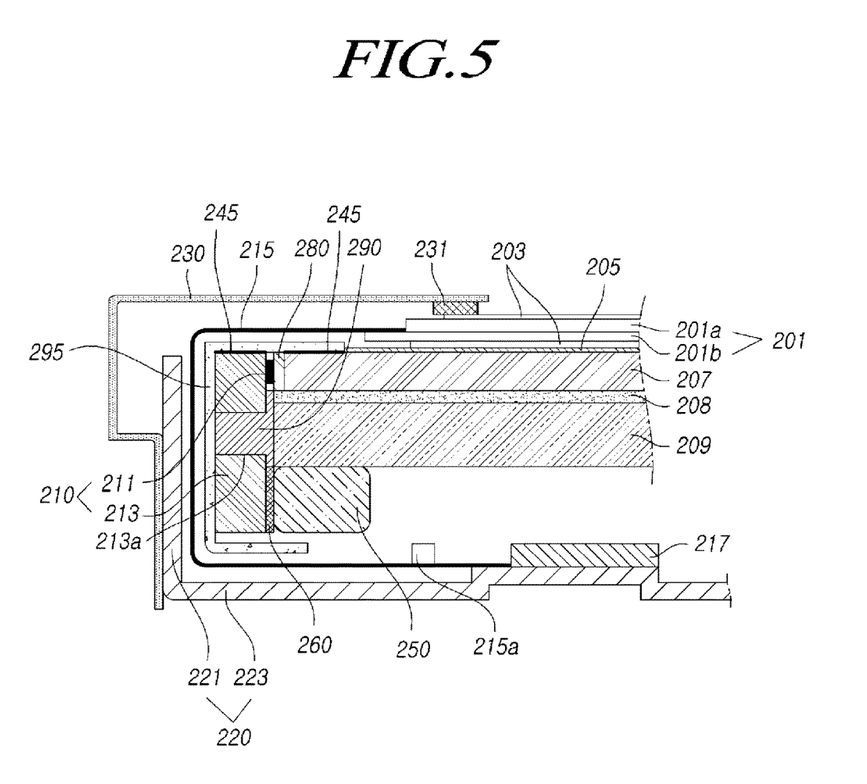
Figure 6A:
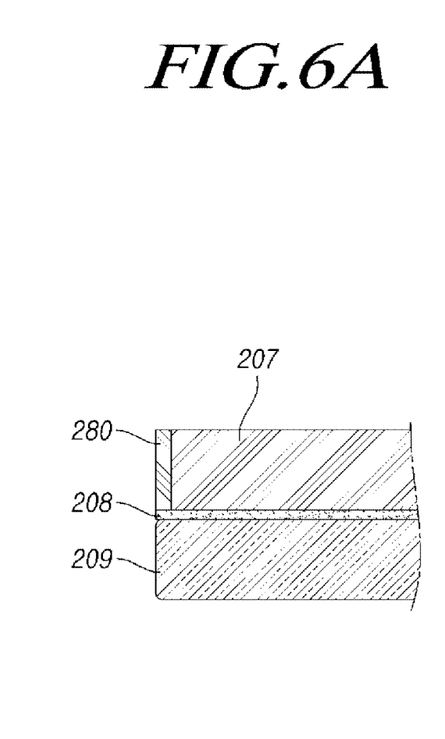
FIGS. 6A to 6C are reference views illustrating portions of a process of assembling a display device according to example embodiments.
Figure 6B:
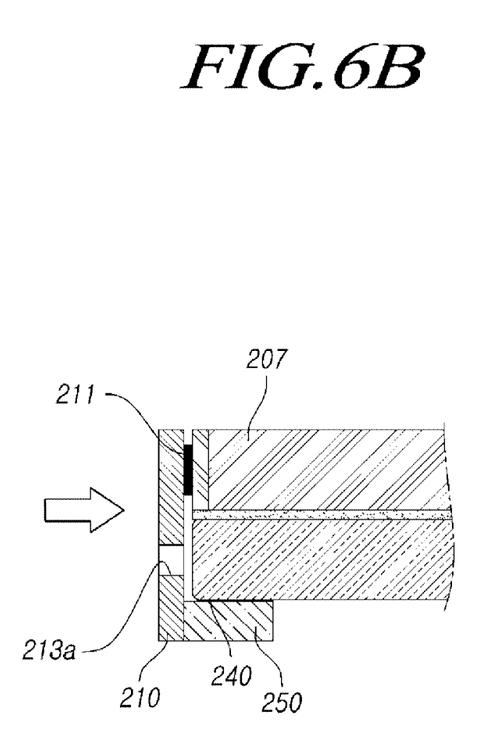
Figure 6C:
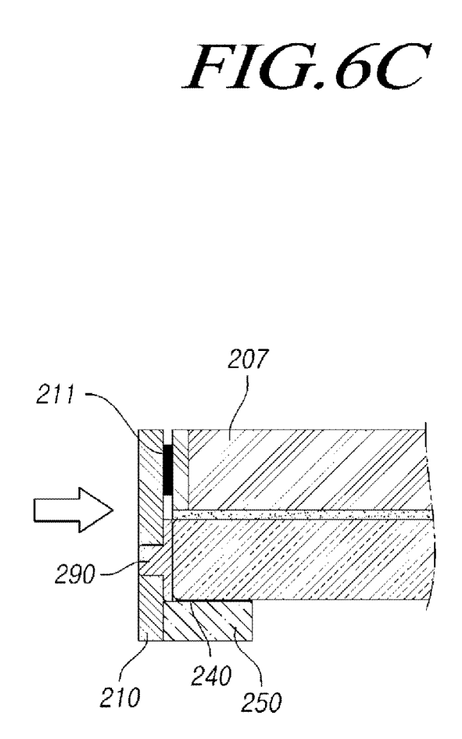

With reference to the examples of FIGS. 4 and 5, the LED array 210 may have a through-hole 213a in a position corresponding to the side surface of the edge of the back cover 209. The through-hole 213a and a space between the through-hole 213a and the back cover 209 may be filled with a curable resin 290, such that the LED array 210 may be fixedly coupled to the back cover 209.

Because the LED array 210 and the back cover 209 may be coupled using the through-hole 213a provided in the PCB 213 of the LED array 210 and the curable resin 290 filled in the space caused by the through-hole 213a, the LED array 210 and the back cover 209 can be more firmly coupled in more correct positions.

The curable resin 290 may include a naturally curable resin, an ultraviolet (UV) curable resin, a thermally curable resin, and the like. However, embodiments are not limited to these examples.

As described above, the display device may further include the support member 250 coupled to and supporting at least one of the side surface of the LED array 210 and the rear surface of the back cover 209. Thus, the support member 250 may be disposed such that the front surface thereof may support the rear surface of the back cover 209, and the side surface thereof may support the LED array 210. At least one of the front surface and the side surface thereof may be coupled to the back cover 209 or the LED array 210 via the bonding member 260, to fixedly couple the LED array 210 and the back cover 209 in assembly positions. Consequently, the light guide plate 207, the back cover 209, and the LED array 210 can be coupled in correct positions.

In addition, the LEDs 211 may be fixedly coupled to the side surface of one edge of the light guide plate 207 via the transparent bonding member 280. Because the LEDs 211 may be attached to the light guide plate 207, as described above, the LED array 210 and the back cover 209 can be coupled in more correct positions.

With reference to the examples of FIGS. 6A to 6C, in a position in which the light guide plate 207, the reflector 208, and the back cover 209 may be coupled by bonding, and the transparent bonding member 280 may be attached to the side surface of at least one edge of the light guide plate 207 (see FIG. 6A), the rear surface of the back cover 209 may be located on the front surface of the support member 250, and the LEDs 211 may be attached to the transparent bonding member 280 (see FIG. 6B). Then, the curable resin 290 may be filled in the through-hole 213*a* and the space between the back cover 209 and the LED array 210, such that the LED array 210 and the back cover 209 can be more firmly coupled in more correct positions (see FIG. 6C).

According to example embodiments, as described above, the light guide member 295 may be bent to cover the front surface of the edge of the light guide plate 207, as well as the front surface and the side surface of the LED array 210, such that light emitted by the LEDs 211 may be directed toward the display panel 201 through the front surface of the light guide plate 207 without being exposed externally.

For example, the light guide member 295 may be coupled to the light guide plate 207 and the LED array 210 via a bonding member 245. The light guide member 295 may significantly reduce the loss of light emitted by the LEDs 211, such that the luminance of light exiting the light guide plate 207 may be significantly improved.

In addition, the cover shield 220 may include a side portion 221 covering at least one side surface of the light guide member 295 and a rear portion 223 covering a rear surface of the light guide member 295. The cover shield 220 may be coupled to a case top 230. A light leakage preventing member 231 may be disposed between and attached to the case top 230 and the display panel 201.

According to example embodiments as set forth above, a coupling structure for the display panel, the backlight unit, and the like may be simplified, thereby reducing procedures required in an assembly process and costs. For example, accumulative allowances occurring in coupling portions of the display panel and the backlight unit may be reduced to reduce or prevent degradations in luminance and defective screen images in the display device due to misalignment, thereby improving consumer satisfaction and marketability.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:
1. A display device, comprising:
  a light guide plate on a rear surface of a display panel, the light guide plate being configured to direct light toward the display panel;
  a reflector on a rear surface of the light guide plate, the reflector being configured to reflect light from a rear of the light guide plate toward a front surface of the light guide plate;
  a back cover on a rear surface of the reflector;
  a light-emitting diode array coupled to an edge of the back cover, the light-emitting diode array comprising:
    a printed circuit board; and
    a plurality of light-emitting diodes at a side surface of an edge of the light guide plate, the plurality of light-emitting diodes being configured to generate light, the plurality of light emitting diodes being attached to the printed circuit board; and
  a support member comprising:
    a front surface configured to support a rear surface of the back cover; and
    a side surface configured to support the light-emitting diode array.

2. The display device of claim 1, wherein a side surface of the light-emitting diode array is fixedly coupled to a side surface of the edge of the back cover via a bonding member.

3. The display device of claim 1, wherein the support member is coupled to at least one of: a side surface of the light-emitting diode array and the rear surface of the back cover.

4. The display device of claim 3, wherein the plurality of light-emitting diodes of the light-emitting diode array are fixedly coupled to the side surface of the edge of the light guide plate via a transparent bonding member.

5. The display device of claim 1, wherein the curable resin comprises one or more of: a naturally curable resin, an ultraviolet curable resin, and a thermally curable resin.

6. The display device of claim 1, wherein the light-emitting diode array is fixedly coupled to the side surface of the edge of the light guide plate via a transparent bonding member.

7. The display device of claim 1, wherein the support member is coupled to at least one of: a side surface of the light-emitting diode array and the rear surface of the back cover.

8. A method of manufacturing a display device, the method comprising:
  providing a light guide plate on a rear surface of a display panel to direct light toward the display panel;
  providing a reflector on a rear surface of the light guide plate to reflect light from a rear of the light guide plate toward a front surface of the light guide plate;
  providing a back cover on a rear surface of the reflector;
  coupling a light-emitting diode array to an edge of the back cover, the coupling the light-emitting diode array comprising:
    providing a printed circuit board; and
    providing a plurality of light-emitting diodes at a side surface of an edge of the light guide plate to generate light, the plurality of light-emitting diodes being attached to the printed circuit board; and
  providing a support member comprising:
    providing a front surface supporting a rear surface of the back cover; and
    providing a side surface supporting the light-emitting diode array.

9. The method of claim 8, further comprising fixedly coupling a side surface of the light-emitting diode array to a side surface of the edge of the back cover via a bonding member.

10. The method of claim 8, wherein the support member is coupled to at least one of: a side surface of the light-emitting diode array and the rear surface of the back cover.

11. The method of claim 10, further comprising fixedly coupling the plurality of light-emitting diodes of the light-emitting diode array to the side surface of the edge of the light guide plate via a transparent bonding member.

12. The method of claim 11, wherein the curable resin comprises one or more of: a naturally curable resin, an ultraviolet curable resin, and a thermally curable resin.

13. The method of claim 11, further comprising fixedly coupling the light-emitting diode array to the side surface of the edge of the light guide plate via a transparent bonding member.

14. The method of claim 11, further comprising coupling the support member to at least one of: a side surface of the light-emitting diode array and the rear surface of the back cover.

\* \* \* \* \*